Walter Freund
INVENTOR.

Patented Aug. 6, 1946

2,405,349

UNITED STATES PATENT OFFICE 2,405,349

ACCUMULATOR

Walter Freund, Tel Aviv, Palestine

Application November 7, 1942, Serial No. 464,887
In Palestine November 18, 1941

1 Claim. (Cl. 136—6)

This invention relates to accumulators.

It is an object of this invention to do away with the acid or alkaline reacting electrolytes of known accumulators.

A further object of the invention is to provide a dry accumulator in which the electrolyte is absorbed by an absorbent mass and which is suitable for use with electric torches or flash lamps instead of the usual dry galvanic cells used for this purpose.

With these objects in view, the accumulator according to the present invention uses a neutral electrolyte, more particularly a neutral aqueous solution of a neutral ammonium sulfate and neutral sodium sulfate, and its electrodes are lead peroxide as positive electrode, and zinc as negative electrode. Instead of zinc, cadmium may also be used, and any reference in the specification to zinc is to include this metal as well.

The electrolyte is absorbed in a suitable absorptive material. Now, in view of the fact that the electrolyte according to this invention remains substantially neutral, the range of substances which are suitable as absorbents is very large and comprises, for example, cotton, flannel or similar tissue, sawdust, cereal flour, sponge, kieselguhr, glass wool, water glass, gelatine, latex and other materials.

Figure 1:
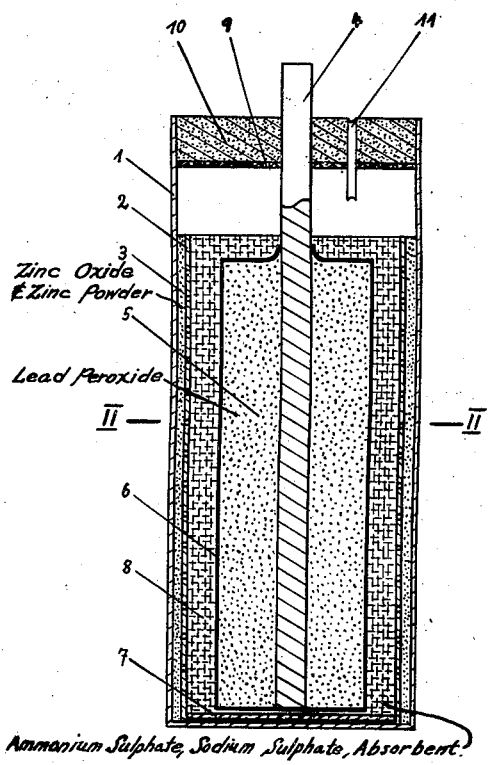
Figure 2:
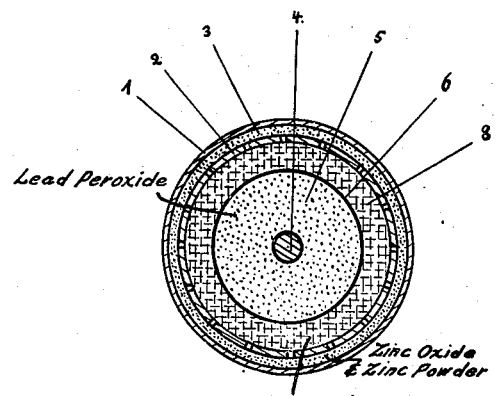

The invention is illustrated, by way of example only, in the accompanying drawing in which Fig. 1 is an axial section of accumulator suitable for use with electric torches, Fig. 2 a cross section on line II—II, Fig. 1.

The accumulator here illustrated has a cylindrical container 1 of zinc. In the container 1, there is concentrically inserted a perforated cylinder 2 which may equally consist of zinc but may also be made from any electrically indifferent material, such as hard rubber, plastics or the like. If made from zinc, its surface may be treated with mercury so as to form a thin coating of zinc-amalgam. The perforations of cylinder 2 may have a diameter of about half a millimeter. The rather narrow space between container 1 and cylinder 2 is filled under pressure with a mixture 3 of zinc oxide and zinc powder and some mercury oxide made into a paste with the aid of an electrolyte solution, for example, an aqueous ammonium sulfate solution of specific gravity of about 1.1. The formation of this electrode is done as cathodic formation by filling an electrolyte solution into the container, inserting a positive pole, and passing current through the system. The electrode thereby assumes the form of a hard mass containing spongy zinc and zinc-mercury amalgam.

The electrolyte proper of the accumulator is composed of about 9 parts by volume of an ammonium sulfate solution of specific gravity 1.16, and 1 part of a sodium sulfate solution of specific gravity 1.12 which is absorbed by one of the absorbent materials mentioned above.

The positive electrode is a rod 4 of lead, surrounded by a layer 5 of lead peroxide moulded onto the rod. It is enclosed in a bag 6 of flannel or the like. The bottom of container 1 is insulated from the positive electrode by a disc 7 of insulating material, for example, glass. Between layer 5 and cylinder 2, an annular space is left which is filled with the absorbent mass 8 soaked with the electrolyte which mass also covers the top of bag 6. Pulverised pumice or the like may be admixed to masses 3 and/or 5. The top end of cylinder 1 is sealed by a disc 9 of cardboard or the like on which an insulating layer 10 of asphalt or the like is cast. A small tube 11 is provided through disc 9 and layer 10 for allowing any gas collecting in the accumulator to leave the latter.

On charging this element, a tension of about 2.4 volts is reached which, however, drops of its own accord to about 1.8 volts. On beginning to use the accumulator in a normal way, the tension drops quite gradually but it may rise again on interrupting the use for some time. This alternation of dropping and rising tension repeats itself quite a number of times until final exhaustion.

After several charging and discharging cycles, the zinc-zinc oxide mass of the negative electrode has become thoroughly hard which is its best state for use.

In charging the accumulator, care should be taken to keep the amperage of the charging current so low as not to provoke a development of gases.

I claim:

In a dry accumulator in combination, a cylindrical container made from a metal selected from the group consisting of zinc and cadmium; a rigid perforated cylindrical sleeve concentrically inserted in said container at a small distance therefrom; a mass containing mercury and a metal selected from the group aforesaid filled into the space between said container and sleeve; an electrically insulating disc inserted in, and forming a bottom seal of, the inner space of said sleeve, a lead rod axially disposed within said container, and a layer of lead peroxide moulded upon said rod; a liquid-permeable wrapper containing said layer and being disposed concentrically within said sleeve in spaced relation thereto; and an absorbent mass soaked with a neutral aqueous solution of neutral ammonium sulfate and neutral sodium sulfate filled into the space between said sleeve and wrapper.

WALTER FREUND.